Oct. 4, 1966  A. J. PEARSON ET AL  3,276,928
REINFORCED MAT CONSTRUCTION AND METHOD OF FORMING SAME
Original Filed March 12, 1956  2 Sheets-Sheet 1
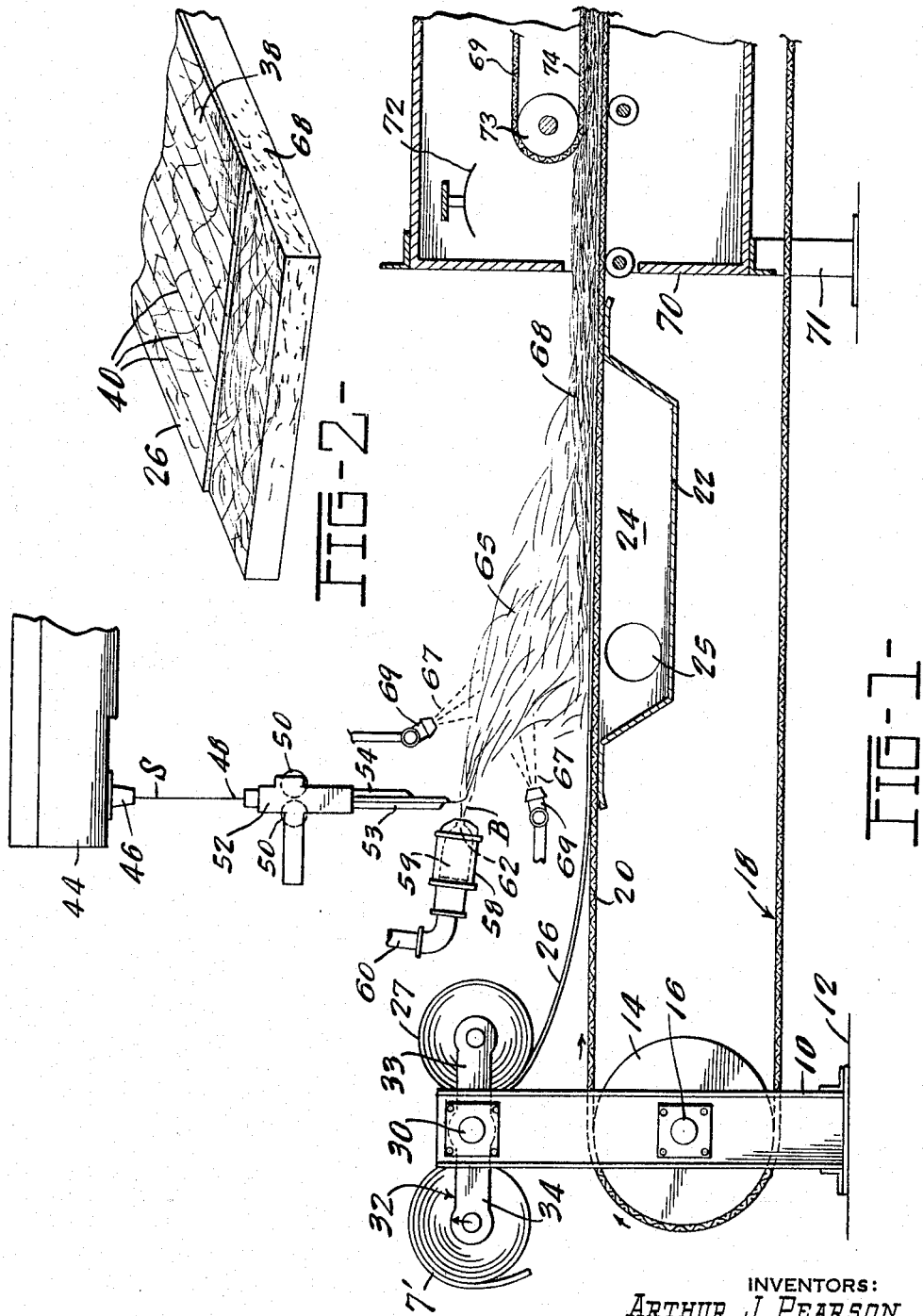
INVENTORS:
ARTHUR J. PEARSON,
BY PAUL R. MILLER.
ATTORNEYS.

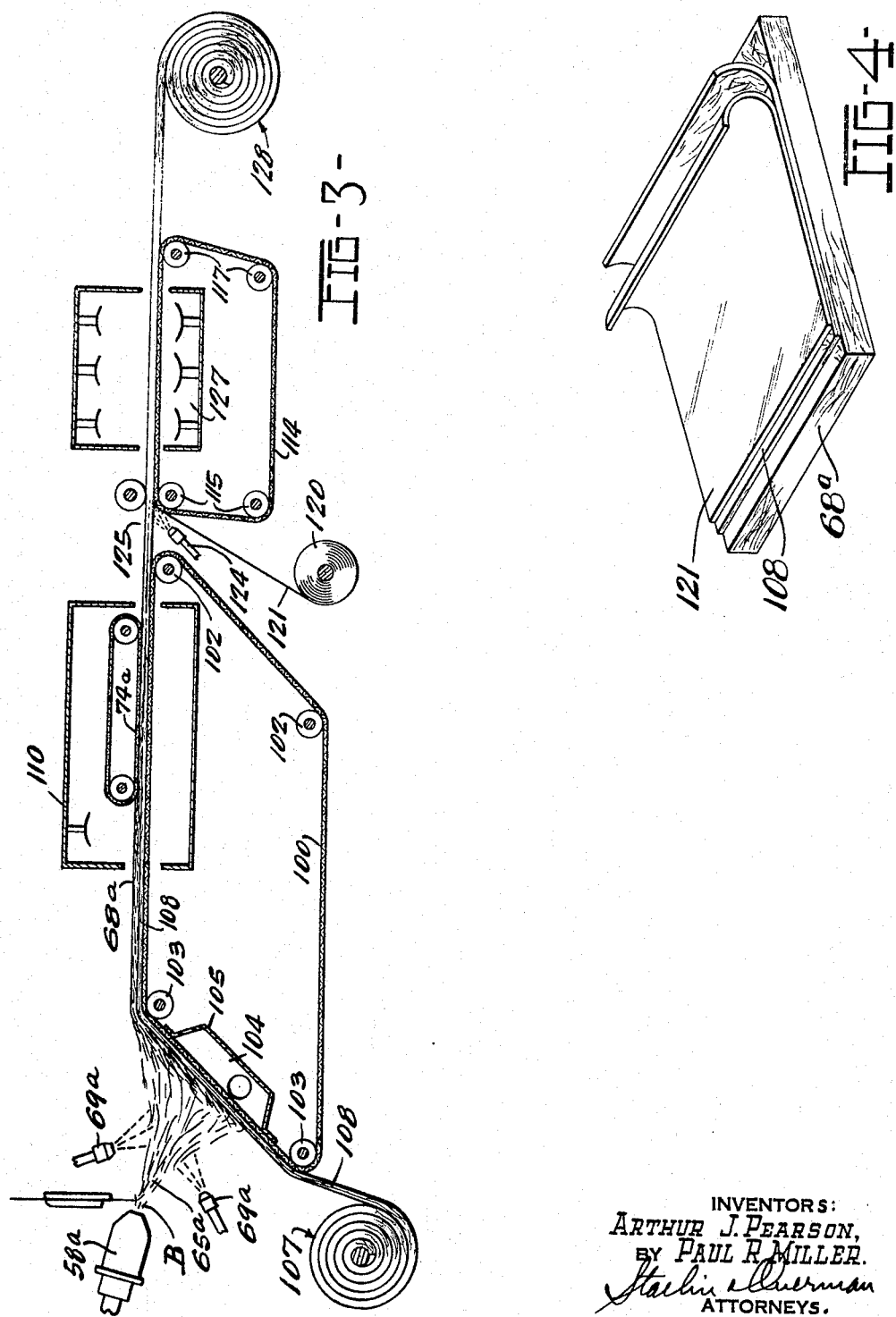

3,276,928
Patented Oct. 4, 1966

3,276,928
REINFORCED MAT CONSTRUCTION AND
METHOD OF FORMING SAME
Arthur J. Pearson, Granville, Ohio, and Paul R. Miller,
Kansas City, Mo., assignors to Owens-Corning Fiberglas Corporation, Toledo, Ohio, a corporation of Delaware
Original application Mar. 12, 1956, Ser. No. 570,844.
Divided and this application July 1, 1960, Ser. No. 40,413
10 Claims. (Cl. 156—62.4)

This invention relates to reinforced mat constructions and a method of producing the same, and more especially to a method of manufacturing a mat or body of mineral fibers joined to and reinforced by a comparatively thin bonded mat having high strength characteristics, and for certain uses the mat construction may be faced with metal sheeting or foil. This application is a division of our copending application Serial No. 570,844, filed March 12, 1956, now abandoned.

It has been commercial practice to manufacture mats or batts of mineral fibers, as for example, fibers formed from glass, slag or fusible rock and such mats have been extensively used for industrial installation for heat and sound insulation. Fibers for use in producing mats for the above purposes are usually formed of fibers attenuated from molten streams of fiber-forming material by engaging the streams or primary filaments formed therefrom with high velocity gaseous blasts which draw the material into fibers of varying lengths.

While mats of this character have satisfactory strength characteristics for most conventional uses, they lack certain strength characteristics for use in installations where it becomes necessary or desirable to suspend substantial lengths of mat as, for example, for insulating tanks of substantial heighth or insulating side walls of buildings where it is desired that the mat be disposed in a vertical or substantially suspended condition. Unreinforced mats of this character may only be used in limited lengths when in suspended condition as excessive length results in the mat being torn by reason of its own weight.

The present invention embraces a method of producing a composite insulating mat construction wherein a comparatively thin sheet or mat incorporating strands, yarns, or bundles of filaments or fibers bonded together, while being continuously advanced in a predetermined path, is laminated with a mass of discrete fibers formed of mineral material collected directly from a fiber attenuating means and joining the prebonded sheet or mat to the mass of discrete fibers by a suitable binder or adhesive and advancing the assemblage through a treating zone for curing or setting the binder or adhesive to form an integrated or composite mat construction having high strength characteristics.

Another object of the invention is the provision of a method for continuously forming mineral fibers and collecting them into a mass and concomitantly orienting a layer of high strength material with the mass of fibers as they are formed, joining the layer of high strength material with the mass of fibers by means of a suitable adhesive preferably concentrated at the region of juncture, and curing the adhesive to form an integrated fibrous mat construction.

Another object of the invention is the provision of a method of forming a high strength composite fibrous mat by continuously advancing a prebonded mat or sheet of high strength fibrous material and simultaneously forming and depositing discrete mineral fibers in haphazard arrangement upon the advancing sheet or mat, applying adhesive to the fibers and establishing a zone of reduced pressure to assist in the collection of the newly formed fibers upon the mat and distribute the adhesive in the region of engagement of the discrete fibers with the prebonded mat in a manner substantially eliminating loss or waste of the adhesive.

Another object of the invention is the provision of a method of forming a composite fibrous body composed of a mass of attenuated fibers of varying lengths with a layer of high strength reinforcing material and facing the composite fibrous body with a sheet or layer of metal foil and integrating the mass of fibers, the reinforcing layer and the metal foil by means of a suitable adhesive cured to form a unit of these components.

Another object of the invention is the provision of a mat construction wherein a mass of individual haphazardly arranged fibers is oriented with a layer or sheet composed of bundles of fibers, the mass of individual fibers and the sheet being joined together by a bonding resin and the individual fibers of the mass held together by a resin forming an integrated mat construction especially usable in installations where high strength characteristics in a direction longitudinally of the mat are desired.

Further objects and advantages are within the scope of this invention such as relate to the arrangement, operation and function of the related elements of the structure, to various details of construction and to combinations of parts, elements per se, and to economies of manufacture and numerous other features as will be apparent from a consideration of the specification and drawing of a form of the invention, which may be preferred, in which:

FIGURE 1 is a semidiagrammatic illustration of one form of apparatus for carrying out steps in the method of the invention;

FIGURE 2 is an isometric view illustrating an article of manufacture or product made according to the method performed by the apparatus shown in FIGURE 1;

FIGURE 3 illustrates in a semidiagrammatic form an arrangement for carrying out steps in the method of producing a mat structure composed of a mass of haphazardly arranged mineral fibers, a prebonded layer or mat of high strength material and a facing of metallic sheeting or foil, and FIGURE 4 is an isometric view illustrating a form of product produced through the method carried out by means of the apparatus shown in FIGURE 3.

While the method of the invention is particularly adaptable in producing a composite fibrous mat or article of mineral fibers such as glass, it is to be understood that mat constructions embodying other types of fibers as for example vegetable fibers and those attenuated from synthetic fiber-forming resins or fibers formed from other mineral materials such as slag and fusible rock may be processed by the method of the invention to form reinforced fibrous articles which may if desired be faced with an impervious material, metal sheeting or foil applied in accordance with the method of the invention.

Referring to FIGURE 1 there is illustrated in semidiagrammatic form an apparatus or arrangement for carrying out the steps of one form of method of the invention. This method embraces the steps of advancing a preformed or prebonded mat or layer of fibers embodying reinforcing strands, yarns or linear bundles of fibers upon which is continuously deposited fibers direct from an attenuating means, a bonding material applied to the fibers and the composite assemblage of bonded mat, mass of mineral fibers and bonding material passed through a treating zone to set or cure the binder to form the product shown in FIGURE 2.

The apparatus illustrated in FIGURE 1 is inclusive of a frame 10 mounted upon a floor 12 or other suitable surface, the frame supporting a roller 14 journalled for rotation in bearings 16 carried by the frame 10. An endless belt type conveyor 18 embraces roller 14, the upper flight 20 of the conveyor forming a mat assembling region or surface.

Other rollers (not shown) assist in supporting the conveyor 18, the conveyor being rotated by suitable driving means (not shown) in the direction of the arrows whereby the upper flight 20 of the conveyor moves at a predetermined rate of speed in a righthand direction as viewed in FIGURE 1. Disposed beneath the upper flight 20 of the conveyor is a sheet metal receptacle 22 forming a chamber 24 which is connected by means of a duct 25 with a source of suction or subatmospheric pressure for purposes hereinafter explained.

The arrangement includes means for supplying a prebonded mat 26 from a supply roll 27. Supported by suitable journals or bearings 30 carried by the frame 10 is a supplemental frame or creel structure 32 formed with oppositely extending pairs of arms 33 and 34. The pairs of arms 33 are adapted to support a supply roll 27 of bonded mat being delivered to the conveyor and arms 34 are adapted to support a standby roll 27' of bonded mat. When the supply roll 27 of bonded mat 26 is exhausted, the bracket 32 is swung in a clockwise direction through 180° bringing the standby supply roll 27' to the position occupied by supply roll 27 shown in FIGURE 1. Through this arrangement the bonded mat 26 is continuously supplied onto the upper flight 20 of the conveyor.

The conveyor 18 is of reticulated or foraminous character as, for example, a wickwire chain or belt. The bonded mat 26 which has been preformed is preferably of the character shown in FIGURE 2 embodying a mass of mineral fibers 38 reinforced with parallel strands, yarns or threads 40 arranged in transversely spaced relation and extending longitudinally of the mat structure and held together by a suitable binder or resin. The reinforcing material 40 may be threads, strands or yarns of glass filaments or fibers or may be formed of other materials such as synthetic fiber-forming resins, vegetable fibers or similar materials.

The reinforcing materials may also be designated as linear bundles of fibers, or filaments to include various forms of linear materials. It is to be understood that the prebonded mat 26 may be formed of continuous bundles of filaments or fibers of glass or other materials such as strands or yarns oriented in overlapping loops and swirls which are bonded into fixed orientation by a suitable bonding material such as phenolformaldehyde in a cured state.

As shown in FIGURE 1, the bonded mat 26 from the supply roll 27 is delivered onto the upper flight 20 of the conveyor and is supported thereby. As the bonded mat 26 is continuously advanced by the conveyor, attenuated mineral fibers are continuously deposited upon the mat 26. In the arrangement shown in FIGURE 1, the fibers are attenuated from primary filaments formed directly from streams of glass or other fiber-forming material.

A forehearth 44 is connected with a melting furnace (not shown) providing a supply of glass or other fiber-forming material in a molten state in the forehearth. Disposed beneath the forehearth 44 is a feeder or bushing 46 provided with a plurality of orifices through which flow streams S of glass or other fiber-forming material. As the streams move away from the feeder 46 they form primary filaments 48. The primary filaments are attenuated from the streams S by means of continuously driven feed rolls 50 supported upon a frame 52.

The frame 52 is formed with guide means or plates 53 and 54 adapted to guide and direct the primary filaments 48 into an intensely hot gaseous blast of high velocity. The high velocity gaseous blast B is supplied by or from a burner 58 of the internal combustion type. The burner 58 is formed with a combustion chamber or confined zone 59 in which is burned a combustible mixture supplied through a manifold or tube 60.

The combustible mixture of fuel and air is substantially completely burned within the chamber 59, the gases undergoing great expansion and reaching temperatures upwards of 3000° F. are discharged or delivered through a restricted orifice or passage 62 at high velocities to form an attenuating blast B.

The primary filaments 48 formed from the glass streams are delivered endwise by the guide plates 53 and 54 into the high velocity blast B, the heat of the gases of the blast softening the advancing extremities of the primary filaments and the high velocity of the gases of the blast drawing or attenuating the softened material to fibers 65. The attenuated fibers are continuously deposited upon the upper surface of the bonded mat 26 under the influence of air movement established by the suction or subatmospheric pressure existing in the chamber 24 disposed immediately beneath the upper flight 20 of the conveyor.

While the fibers 65 are in flight, a binder, adhesive or other bonding material is delivered onto the fibers from applicators 69. It has been found that phenolformaldehyde bonding resin or material sprayed or delivered from the applicators 69 provides a satisfactory bonding medium, although it is to be understood that other resins or bonding agents may be utilized if desired.

The fibers are collected upon the bonded mat 26 in the form of a layer of mass 68 forming a component of the mat construction. This method provides numerous advantages over prior art methods of constructing mats of fibrous materials. In certain prior methods the binder impregnated or coated fibers are deposited directly upon the upper flight of a foraminous conveyor and a substantial amount of the uncured bonding resin in the fibers is lost as waste through the openings or apertures in the foraminous conveyor under the influence of the suction in an air chamber beneath the upper flight of the conveyor.

In the present method comparatively large quantities of bonding agent or material 67 may be sprayed or otherwise delivered onto the fibers 65 and the moving air and spent gases of the blast established by the suction or reduced pressure in chamber 24 influences the movement or dispersion of substantial amounts of the resin binder to accumulate or become concentrated at the region of engagement of the fibers 65 with the upper surface of the bonded mat 26.

The suction results in little or no loss of binder into the suction chamber 24 as the bonded mat 26, while having some degree of porosity, offers substantial resistance and functions as a filter, interrupting the passage of the tacky bonding agent through the mat 26. Thus considerable saving of bonding material is effected as well as securing an effective bond between the bonded mat and mass of fibers 68.

The suction in the chamber 24 also serves to convey away a large portion of the spent gases of the blast. The composite mat structure impregnated with binder is passed through a binder setting or curing zone. As shown in FIGURE 1, the curing or binder setting arrangement is inclusive of an oven 70 mounted upon supports 71. The oven may be provided with one or more heating units 72 providing sufficient heat to set the binder if the binder is of the phenolformaldehyde or ureaformaldehyde type requiring heat in the curing treatment. If the binder is of the nonthermosetting type, air may be passed through the chamber in sufficient volume and of a temperature requisite to set the binder in the mat construction. The mat of haphazardly arranged fibers 68 may be compressed to a desired degree by an endless belt 69 passing around a roller 73, the lower flight 74 of the conveyor engaging and compressing the fibers.

The produce shown in FIGURE 2 wherein the fibrous bonded mat is provided with transversely spaced parallel reinforcing bundles of fibers or filaments is endowed with high strength characteristics lengthwise of the mat construction. The mat formed as above described is of sufficient strength in a lengthwise direction for effective use in suspended condition without liability of the mat tearing or fracturing.

The spacing of the reinforcing elements 40 in the bonded mat may be varied dependent upon the strength characteristics desired in the mat. It has been found that for most vertical type or suspended mat installations, the reinforcing threads or components 40 may be spaced transversely approximately one-quarter of an inch and secure satisfactory results, but it is to be understood that the spacing of the reinforcing elements or their direction of orientation may be modified to render the mat construction suitable for particular installations.

The preferred method of the invention employs fibers 65 attenuated by intensely hot gaseous blasts directed against the fiber-forming material as this arrangement has been found to produce very fine fibers in the nature of from one and one-half to five microns in diameter. It is to be understood, however, that the mass, layer or component 68 of fibers of the mat construction may be produced by engaging streams of molten glass or other fiber-forming material with high velocity blasts of steam or compressed air but such fibers are usually of a coarser character and do not form a mat construction having the insulating characteristics of a mat made of the finer fibers 40 produced by the hot blast method.

As a more specific example of the character of product that may be formed by the method of the invention, it has been found that a mat of approximately one inch in thickness and of a density of about three-quarters of a pound per cubic foot has been found satisfactory for most purposes. It is to be understood however that mat constructions of other fiber densities and thicknesses may made by the method of the invention.

FIGURE 3 illustrates an arrangement for carrying out a modified form of the method of the invention. In this arrangement the individual fibers 65a are formed by attenuating primary filaments delivered endwise into an intensely hot, high velocity gaseous blast B emanating from the combustion chamber in the burner 58a. A suitable adhesive or binder is delivered onto the newly formed fibers 65a by means of binder or adhesive applicators 69a.

An endless belt conveyor of the foraminous type designated 100 is supported upon pairs of rollers 102 and 103 and driven by suitable means (not shown). The flight or zone of the conveyor between the rolls of the pair 103 is preferably inclined or angularly arranged relative to a horizontal plane as illustrated. A suction chamber or zone of reduced pressure 104 provided by a receptacle 105 is disposed beneath the inclined flight of the conveyor 100 arranged in the path of movement of the fibers 65a.

A supply roll 107 of bonded mat 108 is disposed so that them at engages the upper surface of the inclined flight of the conveyor 100 as shown in FIGURE 3. As in the arrangement shown in FIGURE 1, the attenuated individual fibers 65a are delivered onto a surface of the bonded mat 108, the air flow established by suction in the chamber 104 serving to assist in the deposition and retentiton of the fibers upon the mat 108 and to influence the dispersion or distribution of the adhesive in the fibers 65a to accelerate concentration of the adhesive adjacent the surface of the bonded mat receiving the fibers 65a.

The mat formation or assemblage comprising the mass of individual fibers 68a and bonded mat 108 is passed through a curing zone or oven 110 for setting, curing or drying the adhesive or bonding agent. The mat of fibers 68a may be comprised to a desired degree by a lower flight 74a of an endless belt. The method of the arrangement illustrated in FIGURE 3 includes the step of delivering a facing sheet of metallic foil or the like into engagement with the lower surface of the bonded mat 108. A second conveyor 114 of the foraminous endless belt type is supported upon pairs of rollers 115 and 117.

A supply roll 120 of aluminum foil or other thin metallic sheet 121 is disposed whereby the sheet is delivered between the upper flight of the second conveyor 114 and the lower surface of the bonded mat 108. One or more applicators 124 are arranged to spray or deliver adhesive or uncured bonding material 125 upon the surface of the foil 121 adapted to engage the surface of the bonded mat 108.

The assemblage of component 68a, bonded mat 108 and sheet or layer of foil 121 in assembled relation is passed through a curing zone or adhesive setting chamber 127. The finished product or composite mat may be collected in roll form as indicated at 128.

The product resulting from the method performed by the arrangement shown in FIGURE 3 is illustrated in FIGURE 4. The product is a tri-laminar construction embodying a mass of individual fibers in haphazard arrangement indicated at 68a bonded or adhered to the bonded mat 108, and the surface layer of metal foil 121 which is adhesively bonded or joined to the bonded mat 108. The bonded mat may be any of the types hereinbefore described. The mat shown in FIGURE 4 is particularly usable in installations where substantial strength characteristics are desired in conjunction with a moisture barrier, the foil 121 providing an impervious layer for this purpose.

In the various arrangements in the drawings, there is illustrated a single burner from which a gaseous blast B is projected, but it is to be understood that several burners may be disposed in transversely aligned relation dependent upon the width of the mat structure to be produced. When a number of burners producing the blasts are employed, a like number of feeders 46 are utilized to provide the groups of primary filaments 48, one group being fed into each attenuating blast B.

It is apparent that, within the scope of the invention, modifications and different arrangements may be made other than as herein disclosed, and the present disclosure is illustrative merely, the invention comprehending all variations thereof.

We claim:

1. The method of producing a composite fibrous product including the steps of continuously advancing on a movable support a layer of mineral fibers in which the fibers have been interbonded with a cured binder, engaging bodies of heat-softened mineral material with a high velocity gaseous blast to attenuate the bodies to discrete fibers, delivering uncured binder onto the discrete fibers, advancing the layer of interbonded fibers over a confined region of reduced pressure, collecting the binder-laden discrete fibers on a major surface of the layer at the region of reduced pressure, accelerating movement of the uncured binder on the discrete fibers toward the layer under the influence of the reduced pressure to establish a concentration of the uncured binder at the adjacent surface of the layer, and applying heat to the assemblage of collected fibers and the layer of interbonded fibers to set the uncured binder and establish mass integrity in the assemblage.

2. The method of producing a composite fibrous product including the steps of continuously advancing along a support a layer of mineral fibers in which the fibers have been interbonded with a cured binder, engaging bodies of heat-softened mineral material with a high velocity gaseous blast to attenuate the bodies to discrete fibers, delivering uncured binder onto the discrete fibers, advancing the layer of interbonded fibers over a confined region of reduced pressure, collecting the binder-laden discrete fibers on the upper surface of the layer at the region of reduced pressure, filtering out the uncured binder on the layer under the influence of the reduced pressure to establish a concentration of the uncured binder at the upper surface of the layer, sizing the assemblage of collected fibers and the layer of interbonded fibers to a predetermined thickness, and applying heat to set the uncured binder and establish mass integrity in the assemblage while maintaining the assemblage at the predetermined thickness.

3. The method of producing a composite product including the steps of continuously advancing along a support a bonded fibrous mat in which the fibers are bonded together by a cured binder, continuously attenuating bodies of heat-softened mineral material to discrete fibers by a gaseous blast, delivering uncured binder onto the discrete fibers, collecting the binder-laden discrete fibers in a mass upon one major surface of the bonded mat, establishing a region of reduced pressure adjacent the opposite major surface of the bonded mat at the region of collection of the discrete fibers, accelerating movement of the uncured binder in the mass toward the bonded mat under the influence of the reduced pressure to establish a concentration of uncured binder at the region of collection of the discrete fibers on the bonded mat, moving the assemblage of bonded mat and collected fibers through a curing zone, partially compressing the mass of attenuated fibers at the curing zone, and applying heat at the curing zone to set the uncured binder.

4. The method of producing a composite product including the steps of continuously attenuating discrete fibers from fiber-forming mineral material, continuously advancing a prebonded mat, of mineral fibers, the fibers of which are held together by a cured adhesive, applying an uncured adhesive to the attenuated fibers, continuously collecting the attenuated fibers upon a major surface of the advancing prebonded mat forming a layer of fibers arranged in haphazard relation, flowing a stream of air through the layer of fibers and prebonded mat to accelerate movement of the uncured adhesive toward the prebonded mat to establish a concentration of the adhesive at the region of contact of the layer of fibers with the prebonded mat, advancing the assemblage to a curing station, and applying heat at the curing station to set the adhesive.

5. The method of producing a fibrous product including the steps of advancing along a support a layer of mineral fibers in which the fibers have been interbonded with a cured resin and over a region of reduced pressure established adjacent one face of the layer of interbonded fibers, engaging bodies of heat-softened glass with a high velocity gaseous blast and attenuating the bodies to discrete fibers of varying lengths, directing uncured bonding material onto the attenuated fibers while in flight in the blast, collecting the binder-laden discrete fibers in haphazard orientation on the advancing layer of interbonded fibers at the region of reduced pressure, impeding the movement of a substantial amount of the uncured bonding material under the influence of the reduced pressure by the layer of interbonded fibers whereby to increase the amount of the uncured bonding material at the zone of engagement of the discrete fibers with the layer of interbonded fibers, and applying heat to the assemblage of layer of interbonded fibers, the collected discrete fibers and uncured bonding material to set the bonding material whereby to bond the collected discrete fibers together and to the layer of interbonded fibers.

6. The method of producing a mat-faced fibrous product including the steps of advancing a mat of interbonded glass fibers in the general direction of its length adjacent a region of reduced pressure established at one side of the said mat, engaging bodies of glass with a high velocity gaseous blast to attenuate the bodies to discrete fine fibers of varying lengths wherein the gases of the blast move toward said region of reduced pressure, directing bonding material into the blast and toward the attenuated fibers while in flight in the blast, collecting the attenuated discrete fibers into a layer on said mat in haphazard orientation and collecting bonding material onto the surface of the said mat under the influence of the reduced pressure and filtering out bonding material onto said mat whereby a concentration of the bonding material is established at the zone of engagement of the discrete fibers with the surface of the mat, and setting the bonding material in the assemblage of bonded mat and collected layer of haphazardly arranged discrete fibers whereby a high degree of mass integrity is established in the mat-faced fibrous product.

7. The method of producing a composite product including the steps of continuously attenuating heat-softenable fiber-forming mineral material to discrete fibers, continuously advancing a bonded mat of mineral fibers in which the fibers are held together by a cured binder, applying an uncured adhesive to the attenuated discrete fibers, continuously collecting the attenuated fibers upon one major suface of the advancing bonded mat forming a layer of discrete fibers in which the fibers are arranged in haphazard relation, directing a gas stream through the layer of discrete fibers and bonded mat to effect flow of the uncured binder toward the bonded mat to establish a concentration of the uncured adhesive in the layer of fibers at the region of contact of the layer of fibers with the prebonded mat, advancing a layer of impervious material into engagement with the opposite major surface of the bonded mat, dispersing uncured adhesive between the layer of impervious material and the bonded mat, and curing the adhesive dispered between the layer of impervious material and the bonded mat.

8. The method of producing a composite product including the steps of continuously attenuating heat-softenable fiber-forming mineral material to discrete fibers, continuously advancing a bonded mat of mineral fibers in which the fibers are held together by a cured binder, applying an uncured adhesive to the attenuated discrete fibers, continuously collecting the attenuated fibers upon one major surface of the advancing bonded mat forming a layer of discrete fibers in which the fibers are arranged in haphazard relation, directing a gas stream through the layer of discrete fibers and bonded mat to effect flow of the uncured binder toward the bonded mat to establish a concentration of the uncured adhesive in the layer of fibers at the region of contact of the layer of fibers with the prebonded mat, advancing the assemblage of bonded mat, layer of fibers and uncured adhesive through a treating zone to set the uncured adhesive, advancing a layer of impervious material into engagement with the opposite major surface of the bonded mat, dispersing uncured adhesive between the layer of impervious material and the bonded mat, and curing the adhesive dispersed between the layer of impervious material and the bonded mat.

9. The method of producing a composite product including the steps of continuously attenuating bodies of heat-softened mineral material to discrete fibers, continuously advancing along a support a prebonded mat of mineral fibers, the fibers of which are held together by a cured adhesive, applying an uncured adhesive to the attenuated discrete fibers, continuously collecting the attenuated fibers upon a major surface of the advancing prebonded mat forming a layer of fibers with the fibers arranged in haphazard relation, flowing air through the layer of fibers and prebonded mat to effect movement of uncured adhesive in the layer of fibers toward the prebonded mat to establish a concentration of the uncured adhesive at the region of contact of the layer of fibers with the prebonded mat, continuously advancing a sheet of metallic foil into engagement with the opposite major surface of the prebonded mat, dispersing uncured adhesive between the sheet of foil and the prebonded mat, and setting the adhesive.

10. The method of producing a fibrous product including continuously advancing along a support a comparatively thin mat of glass fibers in which the fibers are prebonded together by a cured binder, engaging bodies of glass with a high velocity gaseous blast to attenuate the bodies to discrete fibers, delivering an uncured binder onto the discrete fibers, continuously collecting the discrete fibers on one major surface of the advancing prebonded mat in a fibrous mass of substantially uniform thickness, establishing a region of reduced pressure at the region of collection of the discrete fibers effective at the other major surface of the prebonded mat to effect movement of the uncured binder in the mass of discrete fibers toward the prebonded mat to establish a concentration of uncured binder adjacent the surface of the prebonded mat on which the discrete fibers are collected, applying heat to the assemblage of prebonded mat, discrete fibers and uncured binder at a curing station to set the uncured binder to bond the discrete fibers together and to the prebonded mat, advancing a strip of metal foil in engagement with the exposed surface of the prebonded mat, feeding an uncured binder for disposition between the prebonded mat and the metal foil, and applying heat to set the binder disposed between the prebonded mat and metal foil to adhere the metal foil to the mat.

References Cited by the Examiner

UNITED STATES PATENTS

| | | |
|---|---|---|
| Re. 23,644 | 4/1953 | Grant. |
| 1,799,506 | 4/1931 | Frederick _____ 154—101 |
| 2,172,048 | 9/1939 | Johnson _____ 154—28 |
| 2,552,124 | 5/1951 | Tallman _____ 154—44.15 |
| 2,577,205 | 12/1951 | Meyer et al. _____ 154—101 |
| 2,731,066 | 1/1956 | Hogendobler et al. __ 154—101 X |
| 2,744,044 | 5/1956 | Toulmin _____ 154—101 |
| 2,751,962 | 6/1956 | Drummond _____ 154—101 |
| 2,830,000 | 4/1958 | Labino _____ 154—44.15 |
| 2,868,684 | 1/1959 | Labino _____ 154—128 X |
| 2,890,147 | 6/1959 | Pearson et al. _____ 154—122 |
| 3,081,207 | 3/1963 | Fox _____ 156—62.4 |

EARL M. BERGERT, *Primary Examiner.*

CARL F. KRAFFT, *Examiner.*

P. R. WYLIE, J. F. MATHEWS,
*Assistant Examiners.*